United States Patent [19]
Shibuya et al.

[11] Patent Number: 5,563,706
[45] Date of Patent: Oct. 8, 1996

[54] INTERFEROMETRIC SURFACE PROFILER WITH AN ALIGNMENT OPTICAL MEMBER

[75] Inventors: Masato Shibuya, Saitama-ken; Yutaka Ichihara, Kanagawa-ken; Takashi Gemma, Tokyo-to; Shuji Toyonaga, Kanagawa-ken; Keiji Inada, Chiba-ken, all of Japan

[73] Assignee: Nikon Corporation, Tokyo-to, Japan

[21] Appl. No.: 292,956

[22] Filed: Aug. 22, 1994

[30]  Foreign Application Priority Data

| | | | |
|---|---|---|---|
| Aug. 24, 1993 | [JP] | Japan | 5-229572 |
| Dec. 10, 1993 | [JP] | Japan | 5-341028 |
| May 30, 1994 | [JP] | Japan | 6-137853 |

[51] Int. Cl.$^6$ ............................................. G01B 9/02
[52] U.S. Cl. ............................................ 356/359; 356/351
[58] Field of Search ................................ 356/345, 351, 356/359, 360

[56]  References Cited

U.S. PATENT DOCUMENTS

| | | | |
|---|---|---|---|
| 4,188,122 | 2/1980 | Massie et al. | 356/351 |
| 4,201,473 | 5/1980 | Domenicali et al. | |
| 4,312,570 | 1/1982 | Southwell. | |
| 4,336,439 | 6/1982 | Sasnett et al. | |
| 4,379,622 | 4/1983 | Fischer et al. | |
| 4,537,473 | 8/1985 | Maschmeyer | 356/359 |
| 4,696,572 | 9/1987 | Ono | 356/360 |
| 4,732,483 | 3/1988 | Biegen | 356/351 |
| 4,784,490 | 11/1988 | Wayne | 356/351 |
| 4,791,584 | 12/1988 | Greivenkamp, Jr. | 356/360 |
| 5,033,855 | 7/1991 | Matsui | 356/359 |
| 5,054,924 | 10/1991 | Hochberg | 356/359 |
| 5,127,734 | 7/1992 | Ohi et al. | 356/359 |
| 5,210,591 | 5/1993 | De Groot | 356/359 |
| 5,377,007 | 12/1994 | Yasuda et al. | 356/359 |

OTHER PUBLICATIONS

Ealing Electro–Optics Product Guide, 1987/1988 Product Guide, p. 300.

*Primary Examiner*—Samuel A. Turner
*Assistant Examiner*—Robert Kim
*Attorney, Agent, or Firm*—Finnegan, Henderson, Farabow, Garrett and Dunner

[57]  ABSTRACT

In an interferometer, reflected light from a reference surface and a subject surface are introduced to an imaging optical system through a beam splitter, and an interference fringe formed from light reflected from the both surfaces is observed with a detection optical system. An alignment optical member is disposed in an optical path between the imaging optical system and an image plane of the interference fringe such that the rear focal point of the alignment optical member is located at the image plane. The alignment optical member is inserted in the optical path in aligning the subject surface and is removed in measuring the interference fringe. Accurate alignment of the subject surface is easily attained. A beam expander is interposed between a polarizing beam splitter and the subject surface and a 90° retarder is interposed between the beam expander and the subject surface. The 90° retarder is constructed of one or a plurality of reflecting mirrors formed of dielectric multilayer films. Noise introduced to the imaging optical system is minimized.

8 Claims, 9 Drawing Sheets

INTERFEROMETRIC SURFACE PROFILER WITH AN ALIGNMENT OPTICAL MEMBER

BACKGROUND OF THE INVENTION

1. Field of the Invention

The present invention relates to an interferometer to be used for measuring a surface shape of an optical member or the like.

2. Description of the Prior Art

Interferometers are now widely used as highly accurate means for measuring a surface shape of an optical member or the like. In a typical interferometer, coherent light emitted from a light source is introduced through a beam splitter to a reference surface and a subject surface to be measured, each of which reflects the incident light to the beam splitter. The reflected lights by the reference surface and the subject surface are then introduced to an imaging optical system through the beam splitter. The imaging optical system causes the reflected lights to interfere with each other to form an interference fringe, which is observed by use of a detection optical system. Where the subject surface has an undulation, the optical path length of the incident and reflected light to and from the subject surface is changed to cause an optical phase shift corresponding to the undulation. Therefore, the subject surface profile can be measured by observing the interference fringe formed through interference between the two reflected lights. In this type of interferometer, it is necessary, prior to the observation of the interference fringe, to perform alignment for accurately determining the position and orientation of the subject surface. In aligning the subject surface, spots are formed by reflected lights from the reference and subject surfaces by use of an alignment optical system, and then coarse alignment is effected by making those two spots coincide with each other. Alternatively, coarse alignment is attained by placing the reflected light from the subject surface an alignment mark. Then, after the alignment optical system is replaced by a measurement optical system, fine alignment is performed while the interference fringe is observed. Conventionally, the alignment optical system is provided entirely separately from the measurement optical system which deals with incident and reflected lights to and from the both surfaces, as well as from the imaging optical system for causing the reflected lights from both surfaces to interfere with each other to be imaged into the interference fringe. As a result, the overall size of the interferometer is large, and a cumbersome operation is needed to switch between the aligning mode and the measuring mode. In addition, since the magnification of the alignment optical system is conventionally fixed, the alignment accuracy cannot be improved beyond a certain limit.

In recent years, with the use of light sources of shorter wavelength, requirements for the profile irregularity of optical members have become stricter. For example, in the case of an optical element for use with X-rays, the required accuracy is as high as $\lambda/100$, where $\lambda$ is the wavelength of light used in an interferometer, e.g., 633 nm. In order to conduct a measurement on the profile irregularity of so strict a level, an interferometer should also be highly accurate. However, an interferometer has aberrations, which cannot be eliminated completely. To solve this problem, as is customarily practiced, a standard surface which has been examined and assured to be very accurate is measured using an interferometer, and resulting measurement data is subtracted from measurement data obtained with an actual subject surface. Thus, aberrations of the interferometer itself can be eliminated. In practicing this method, the profile irregularity of the standard surface must be sufficiently superior to that of the actual subject surface. However, since it is very difficult to manufacture a highly accurate standard surface, it is an established procedure to use the same standard surface commonly for measurements of subject surfaces having different curvatures. In this case, when an actual subject surface is measured, focusing needs to be performed again after aberration data of the interferometer itself has been obtained by using the standard surface. Since this refocusing operation changes the size of the interference fringe, it is impossible to correctly compensate for the aberrations.

It is common to use a polarizing beam splitter in order to effectively utilize light emitted from a light source. In this case, a quarter-wave plate is inserted in an optical path so that the linearly polarized incident light entering into the quarter-wave plate and the linearly polarized reflected light exiting from the plate are perpendicular in vibration direction with each other. In conventional interferometers, the quarter-wave plate is disposed directly behind the polarizing beam splitter where the light assumes a parallel form. Therefore, light reflected by a lens surface that is located directly behind the quarter-wave plate has the same polarization angle as measurement light, i.e., reflected light coming from a reference surface or a subject surface. Thus, the reflected light as produced by the lens surface located right behind the quarter-wave plate returns to the polarizing beam splitter together with the measurement light and is introduced to the imaging optical system, so as to become noise superimposed on the measurement light. This noise is a factor of causing an error in measurement results.

SUMMARY OF THE INVENTION

An object of the present invention is therefore to provide an interferometer which allows alignment of a subject surface to be attained easily. Another object of the invention is to provide an interferometer which enables correct compensation of aberrations of the interferometer itself even in case of using the same standard surface commonly for subject surfaces having different curvatures. A further object of the invention is to provide an interferometer which can reduce noise that is introduced into an imaging optical system.

The present invention has been made to attain the above objects. That is, there is provided an interferometer comprising a light source emitting coherent light, a beam splitter introducing the coherent light to a reference surface and a subject surface to be measured each reflecting incident light to the beam splitter, an imaging optical system forming at an image plane an interference fringe of the reflected lights from the both surfaces through the beam splitter, and a detection optical system measuring the interference fringe, wherein; the interferometer further comprises an alignment optical member removably interposed in an optical path between the imaging optical system and the image plane so that a rear focal point of the alignment optical member is located at the image plane, and the alignment optical member is inserted into the optical path in aligning the subject surface and is removed from the optical path in measuring the interference fringe.

With the above construction, when the alignment optical member is inserted between the imaging optical system and the image plane of the interference fringe, the reflected light from the reference surface forms a spot on the imaging plane at the position of the optical axis, and the reflected light from the subject surface forms a spot on the imaging plane at a position that is deviated from the position of the optical axis depending on deviations in the position and orientation of the subject surface. Therefore, alignment of the subject surface can be attained by adjusting the position and orientation of the subject surface so that these two spots coincide with each other.

According to another aspect of the invention, there is provided an interferometer comprising a light source emitting coherent light, a polarizing beam splitter introducing linearly polarized incident light to a reference surface and a subject surface to be measured each reflecting incident light to the polarizing beam splitter, an imaging optical system forming an interference fringe of the reflected lights from the both surfaces through the polarizing beam splitter, and a detection optical system measuring the interference fringe, wherein; the interferometer further comprises a beam expander interposed between the polarizing beam splitter and the subject surface for expanding diameter of the linearly polarized incident light to the subject surface, and a 90° retarder interposed between the beam expander and the subject surface for converting the linearly polarized incident light to circularly polarized incident light, and the 90° retarder is constructed of one or a plurality of reflecting mirrors formed of dielectric multilayer films.

With the above construction, the reflected light by the beam expander is linearly polarized as the linearly polarized incident light. Whereas, after passing through the 90° retarder in its go and return travels, the reflected light by the subject surface becomes linearly polarized light whose vibration direction is perpendicular to that of the linearly polarized incident light. Therefore, the reflected light from the beam expander and the reflected light from the subject surface can be separated from each other by the polarizing beam splitter, to allow only the reflected light from the subject surface to be introduced to the imaging optical system.

DETAILED DESCRIPTION OF THE PREFERRED EMBODIMENT

The present invention will be hereinafter described by way of embodiments.

Figure 1:
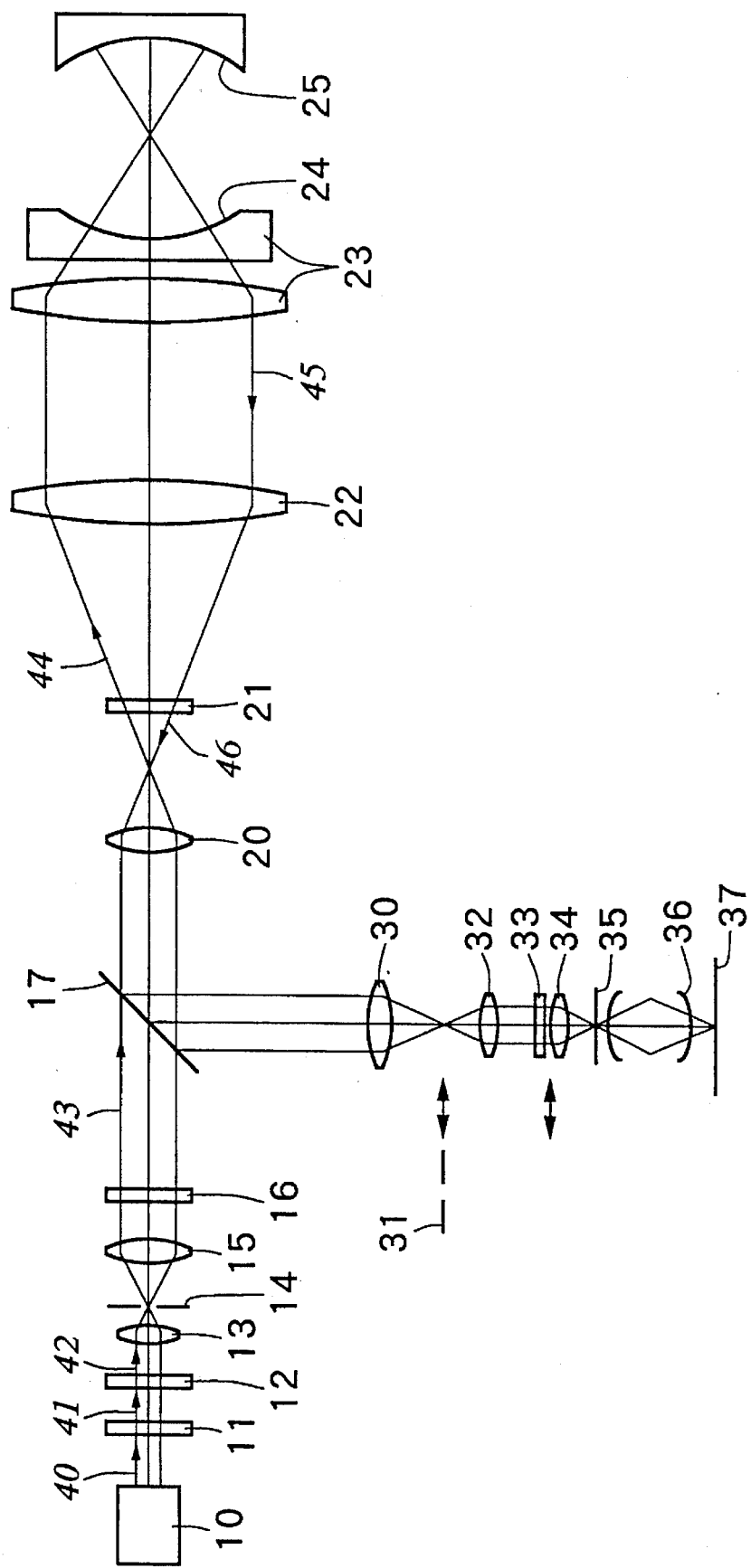
FIG. 1 shows a configuration of a Fizeau interferometer according to a first embodiment of the present invention in its alignment mode.
Figure 2:
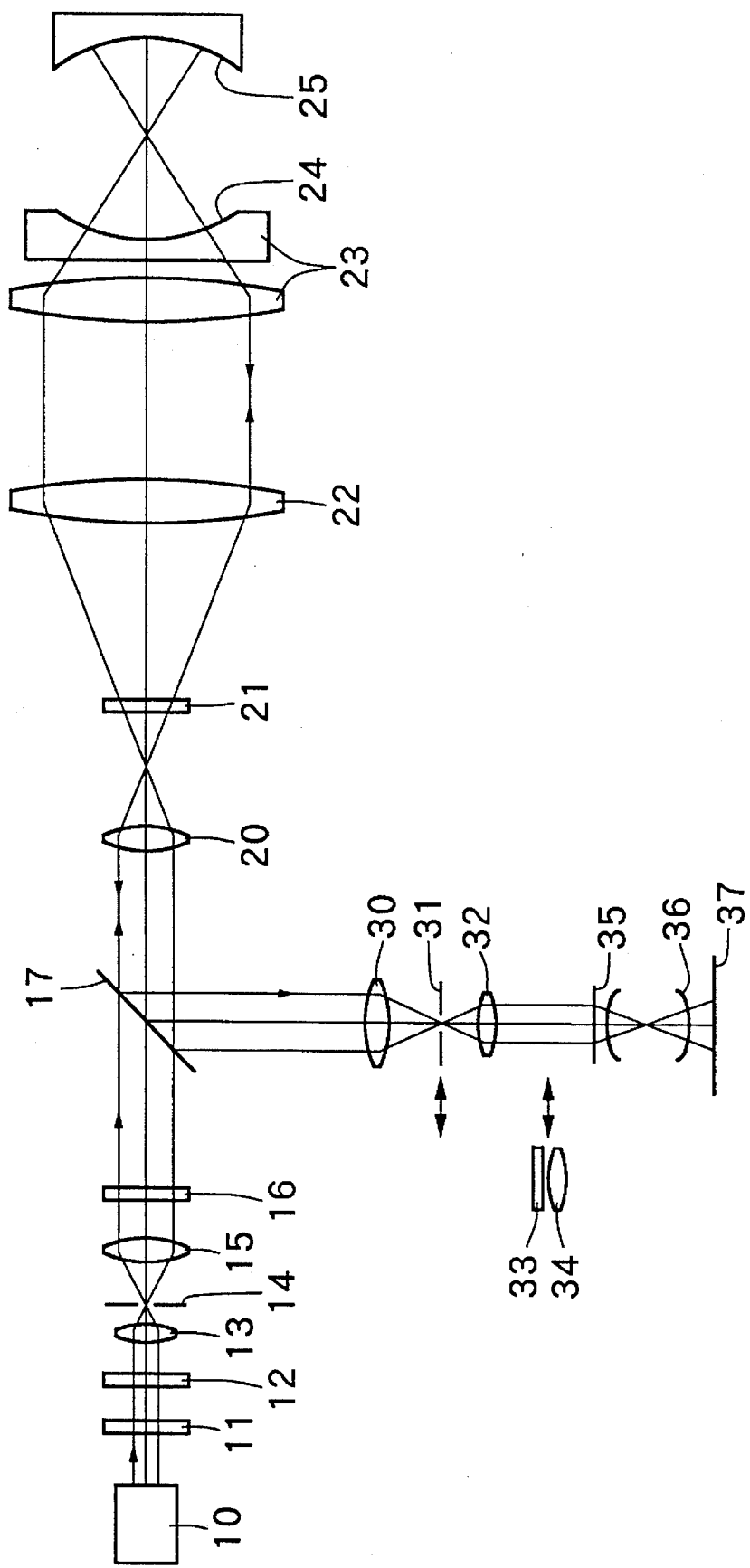
FIG. 2 shows a configuration of the first embodiment in its measurement mode.

FIGS. 1 and 2 show a first embodiment of the invention. This embodiment is a Fizeau interferometer using a polarizing beam splitter. On the optical axis of a laser light source 10 are arranged a linear polarizer 11, a first quarter-wave plate 12, a first condenser lens 13, a first pinhole 14, a first collimator lens 15, a second quarter-wave plate 16, a polarizing beam splitter 17, a second condenser lens 20, a third quarter-wave plate 21, a second collimator lens 22, a Fizeau lens 23 and a subject surface 25 in this order. A reference surface 24 is formed on the back side of the Fizeau lens 23 to reflect part of incident light. The members from the second condenser lens 20 to the subject surface 25 constitute a measurement optical system. The laser light source 10 is so disposed as to mainly generate S-polarized light, i.e., linearly polarized light whose vibration direction or polarization angle is perpendicular to the plane of incidence of the polarizing beam splitter 17, and the linear polarizer 11 is so disposed as to transmit only S-polarized light. The first, second and third quarter-wave plates 12, 16 and 21 are so disposed that their optic axes are inclined by 45° from the plane of incidence of the polarizing beam splitter 17. The first condenser lens 13 and the first pinhole 14 function as a spatial filter. The second condenser lens 20 and the second collimator lens 22 function as a beam expander.

A third condenser lens 30, a second pinhole 31, a third collimator lens 32, a neutral density filter 33, an alignment lens 34, a variable power lens 36 and an image pickup element 37 are arranged in this order in the travelling direction of reflected light from the polarizing beam splitter 17 after returning from the subject surface 25, which direction is perpendicular to the optical axis extending from the laser light source 10 to the subject surface 25. An imaging optical system consisting of the third condenser lens 30, second pinhole 31 and third collimator lens 32 is constituted as a double-sided telecentric system and adapted to be movable as a single unit along the optical axis. The second pinhole 31 can not only be moved along the optical axis together with the third condenser lens 30 and the third collimator lens 32, but can also be removed from the optical path. The imaging optical system forms an interference fringe of reflected lights from the reference surface 24 and the subject surface 25 on an image plane 35, and the alignment lens 34 is so disposed that its rear focal point is located on the image plane 35. The neutral density filter 33 and the alignment lens 34 are so constituted as to be removable from the optical path as a single unit. The variable power lens 36 and the image pickup element 37 constitute a detection optical system. A zoom lens can be used as the variable power lens 36.

In this embodiment as constituted in the above manner, alignment of the subject surface 25 is performed prior to measuring an undulation of the subject surface 25, in order to adjust the position and orientation of the subject surface 25. In this alignment mode, as shown in FIG. 1, the second pinhole 31 is removed from the optical path, and the neutral density filter 33 and the alignment lens 34 are inserted into the optical path. The laser light source 10 is so disposed that the generated linearly polarized light 40 is mainly S-polarized light, and only the S-polarized light 41 of the linearly polarized light 40 passes through the linear polarizer 11. The S-polarized light 41 transmitted from the polarizer 11 is converted to circularly polarized light 42 by the first quarter-wave plate 12. The circularly polarized light 42 passes through the first condenser lens 13, first pinhole 14 and collimator lens 15, and is then converted by the second quarter-wave plate 16 to P-polarized light 43, which passes through the polarizing beam splitter 17. In the above process, light reflected by the surface of the first condenser lens 13 or the first collimator lens 15, which is circularly polarized light rotating reversely to that of the incident circularly polarized light 42, retrogresses along the incident optical path and is converted by the first quarter-wave plate 12 to P-polarized light, which cannot pass through the linear polarizer 11. Thus, reflected light produced by the first condenser lens 13 or the first collimator lens 15 does not reach the laser light source 10.

The P-polarized light 43 transmitted from the polarizing beam splitter 17 passes through the second condenser lens 20, and is then converted to circularly polarized light 44 by the third quarter-wave plate 21. After passing through the second collimator lens 22, the circularly polarized light 44 reaches the Fizeau lens 23. Part of the circularly polarized incident light 44 is reflected by the reference surface 24 that is formed on the back face of the Fizeau lens 23, and the remaining part passes through the reference surface 24 and is reflected by the subject surface 25. These reflected lights become circularly polarized lights 45 rotating reversely to that of the circularly polarized incident light 44. The circularly polarized reflected lights 45 retrogress along the incident optical path, and are converted by the third quarter-wave plate 21 to S-polarized lights 46, which can not pass through the polarizing beam splitter 17, and are reflected thereby. In this process, light reflected by the surface of the second condenser lens 20 retrogresses along the incident optical path while maintaining the same polarization state as the incident P-polarized light 43. This reflected P-polarized light passes through the polarizing beam splitter 17. Thus, reflection light produced by the surface of the second condenser lens 20 does not reach the imaging optical system.

After being reflected by the polarizing beam splitter 17, the reflected lights from the reference surface 24 and the subject surface 25 pass through the third condenser lens 30, third collimator lens 32, neutral density filter 33 and alignment lens 34, and form respective spots on the image plane 35. The position and orientation of the subject surface 25 are adjusted while these spots are observed by the image pickup element 37 through the variable power lens 36. Now, if z-axis is taken along the optical axis direction and x- and y-axes are taken as the mutually orthogonal two directions perpendicular to the z-axis, and if the subject surface 25 is rotationally symmetrical around the z-axis, then a positional deviation of the subject surface 25 along the x-axis causes a positional deviation of the corresponding spot in the x-axis direction. Similarly, a positional deviation of the subject surface 25 along the y-axis causes a positional deviation of the spot in the y-axis direction. A positional deviation of the subject surface 25 along the z-axis causes uniform reduction or enlargement of the spot. On the other hand, a deviation of the subject surface 25 in the orientation around the x-axis causes enlargement of the spot in the y-axis direction. Similarly, a deviation of the subject surface 25 in the orientation around the y-axis causes enlargement of the spot in the x-axis direction. In view of these facts, the alignment of the subject surface 25 is performed by adjusting the position and orientation of the subject surface 25 so that the corresponding spot becomes a smallest circle and coincides with the spot made by the reference surface 24. The focal length of the alignment lens 34 should be determined in consideration of detection ranges and sensitivities of the position and orientation of the subject surface 25. A deviation in position or orientation of the subject surface 25 can be calculated backward from a positional deviation and a shape of the corresponding spot using the focal length of the alignment lens 34, the magnification of the variable power lens 36, etc. Therefore, it is possible to automatically perform the alignment of the subject surface 25 by observing the corresponding spot.

After the alignment of the subject surface 25 is attained, the measurement mode for measuring an undulation of the subject surface 25 is started. In the measurement mode, as shown in FIG. 2, the second pinhole 31 is inserted into the optical path and the neutral density filter 33 and the alignment lens 34 are removed from the optical path. As a result, the imaging optical system causes the reflected lights from the reference surface 24 and the subject surface 25 to form an interference fringe. While the interference fringe is observed with the image pickup element 37 through the variable power lens 36, the imaging optical system is moved and adjusted along the optical axis so that the interference fringe is imaged on the image plane 35. After the interference fringe is imaged on the image plane 35, a further detailed alignment is performed on the subject surface 25 while the interference fringe is observed. Since the interference fringe thus observed represents an undulation of the subject surface 25, the surface profile of the subject surface 25 can be measured by this interferometer. A computer may be used in the process of determining the subject surface profile from the measurement results of the interference fringe.

As described above, according to this embodiment, the switching from the alignment mode to the measurement mode can be performed easily by inserting the second pinhole 31 into the optical path and removing the neutral density filter 33 and the alignment lens 34 from the optical path. Since the imaging optical system of this embodiment is constituted as a double-sided telecentric system, the size of an interference fringe does not vary even when refocusing is performed for another subject surface 25 having a different curvature. That is, even with the use of a standard surface whose curvature is different than the subject surface 25, aberrations of the interferometer itself can be compensated correctly. Further, in this embodiment, the third quarter-wave plate 21 is disposed closer to the subject surface 25 than the second condenser lens 20 that is disposed right behind the polarizing beam splitter 17. Therefore, light reflected by the surface of the second condenser lens 20 passes through the polarizing beam splitter 17, and does not reach the imaging optical system, which contributes to the reduction of noise superimposed on the reflected lights from the reference and subject surfaces 24 and 25.

The third quarter-wave plate 21 can be disposed at any position downstream of the second condenser lens 20. However, to reduce the aperture of the third quarter-wave plate 21, it is preferred that the plate 21 be disposed in the vicinity of the focus of the second condenser lens 20 where the light is converging or diverging. In this case, the incident angle of the light varies as it deviates from the optical axis, and an optical phase shift due to the plate 21 varies accordingly. However, it has been confirmed by a theoretical calculation that the above variations can be made small enough to avoid problems in actual use by thinning the plate 21. In addition, to reduce influences of light reflected by the surface of the plate 21, it is desirable to dispose the plate 21 on the diverging light side of the focus of the second condenser lens 20 rather than the converging light side, i.e., to dispose it on the side of the second collimator lens 22. To reduce influences of light reflected by the surface of the plate 21, it is also effective to form an anti-reflection coating on the surface of the plate 21, or to slightly incline the plate 21. On the other hand, not only light reflected by the surface of the second condenser lens 20 but also light reflected by the second collimator lens 22 can be prevented from being superimposed, as noise, on the measurement light by disposing the third quarter-wave plate 21 between the second collimator lens 22 and the Fizeau lens 23. But it is noted that since the second collimator lens 22 is distant from the image plane 35, usually it does not cause so large noise as to need to be eliminated. Since the second collimator lens 22 generally has a large aperture, e.g., larger than 100 mm in an ordinary Fizeau interferometer, the aperture of the third quarter-wave plate 21 also needs to be large when it is disposed between the second collimator lens 22 and the Fizeau lens 23, which is still undesirable in terms of costs.

In this embodiment, the second pinhole 31 is used to eliminate flare light in the measurement mode. In the alignment mode, the second pinhole 31 is removed from the optical path to avoid such a case that the reflection light from the subject surface 25 that is inclined from the optical axis is cut by the pinhole 31. Instead of the pinhole 31, a variable diaphragm may be used, in which case the diaphragm is opened sufficiently in the alignment mode. Alternatively, a configuration is also possible in which neither the pinhole 31 nor the diaphragm is used.

Although the neutral density filter 33 is used in this embodiment, it may be omitted. But in such a case, it is desirable to use a certain light attenuating means, because the spot converged by the alignment lens 34 has a very high brightness, which may exceed the dynamic range of the image pickup element 37. For example, the alignment lens 34 itself may be made of a low-transmittance material such as colored glass. Variable light attenuation can be attained by removably disposing a neutral density filter whose transmittance varies with the position thereon at an arbitrary position in the optical path of the interferometer separately from the alignment lens 34, and adjusting the partial removal distance of the neutral density filter. Variable light attenuation can also be attained by inserting a linear polarizer in any of the linearly polarized light sections and adjusting its rotation angle. Light attenuation can also be attained by adjusting the output of the laser light source 10. Further, the sensitivity of the image pickup element 37 may be made variable.

Although in this embodiment the optical lens 34 is used as the alignment optical member, a zone plate may be used instead thereof. In this case, the light intensity of the converged spot can be reduced by lowing the diffraction efficiency of the first-order light. If the intensity of the 0th-order light is sufficiently high, an interference fringe can be observed together with the converged spot. With this configuration, a fine alignment operation can also be performed even in the alignment mode, and the switching to the measurement mode can be effected simply by removing the zone plate from the optical path.

The imaging optical system is moved in accordance with the position of the subject surface 25. And it may be the case that there is not sufficient space accommodate the neutral density filter 33 and the alignment lens 34 when the imaging optical system is brought closest to the image plane 35. In such a case, an alignment operation is performed after moving the imaging optical system away from the image plane 35 and then inserting the neutral density filter 33 and the alignment lens 34. Although an interference fringe is not focused properly in this case, an alignment operation can be performed without any problem. After completion of the alignment operation, the measurement mode can be started by removing the neutral density filter 33 and the alignment lens 34 from the optical path and returning the imaging optical system to its original position. To quickly returning the imaging optical system to its original position, it is preferred to use a sensor for detecting the position of the imaging optical system and controlling the position of the imaging optical system automatically.

The variable power lens 36 of this embodiment may be replaced by a lens of constant power. On the other hand, a variable power lens may be used as the alignment lens 34. The polarizing beam splitter 17 of this embodiment may be replaced by other types of beam splitter. Further, while this embodiment is directed to the Fizeau interferometer, the invention can also be applied to the Twyman-Green interferometer.

In the above first embodiment, since the third quarter-wave plate 21 is disposed between the second condenser lens 20 and the second collimator lens 22, light reflected by the surface of the second condenser lens 20 does not reach the imaging optical system. However, as mentioned above, light reflected by the surface of the second collimator lens 22 might reach the imaging optical system. Further, since the third quarter-wave plate 21 is disposed in the converging optical system, the optical phase shift due to the plate 21 might vary as the light deviates from the optical axis. Although these problems in no way deny the usefulness of the interferometer of the first embodiment, it is more preferable to completely solve these problems. These problems can be solved by disposing the third quarter-wave plate 21 behind the second collimator lens 22. However, with such a configuration, as described above, the aperture of the third quarter-wave plate 21 needs to be increased. The following embodiments are directed to interferometers which allow only the measurement lights to be introduced to the imaging optical system by disposing wavelength plates only at positions where the light diameter is small, or by not using wavelength plates at all.

Figure 3:
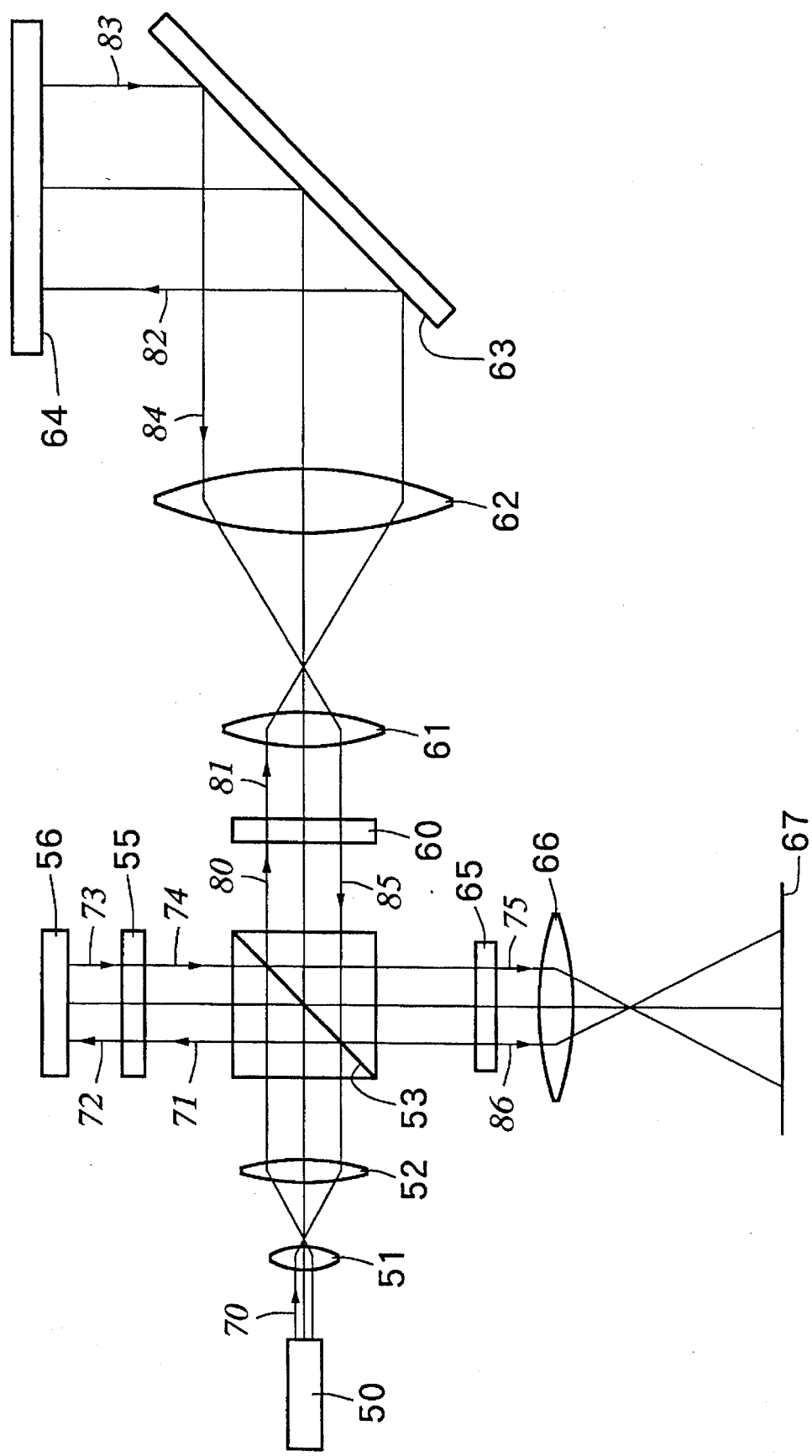
FIG. 3 shows a configuration of a Twyman-Green interferometer according to a second embodiment of the invention.
Figure 4:
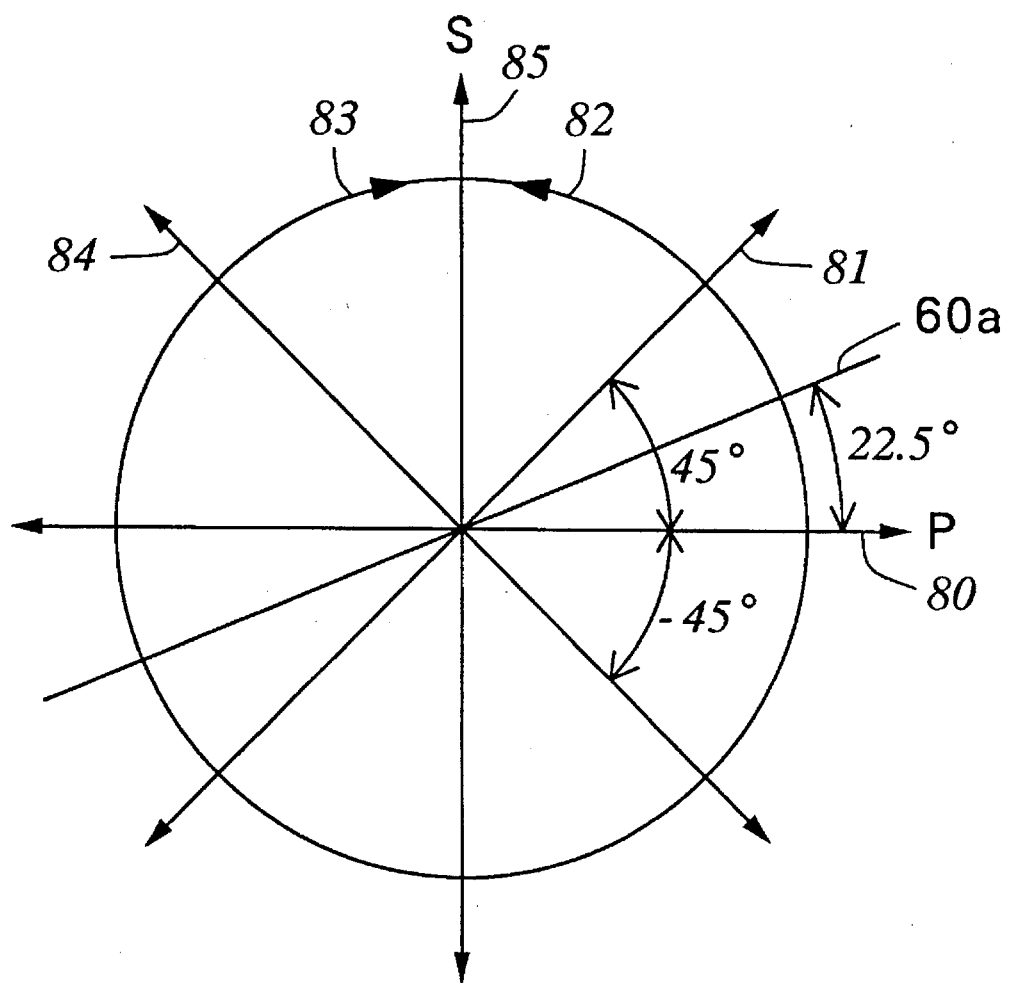
FIG. 4 illustrates polarization states of light in the second embodiment.

FIGS. 3 and 4 show a second embodiment of the invention, which is a Twyman-Green interferometer using a polarizing beam splitter. On the optical axis of a laser light source 50 are arranged a first condenser lens 51, a first collimator lens 52, a polarizing beam splitter 53, a half-wave plate 60, a second condenser lens 61, a second collimator lens 62, a reflecting mirror 63 and a subject surface 64 in this order. The members from the half-wave plate 60 to the subject surface 64 constitute a measurement optical system. The laser light source 50 is so disposed as to generate linearly polarized light whose polarization angle is inclined from the plane of incidence of the polarizing beam splitter 53 by 45°. The first condenser lens 51 and the first collimator lens 52 function as a first beam expander for expanding the beam diameter to about 20 mm. Similarly, the second condenser lens 61 and the second collimator lens 62 function as a second beam expander for expanding the beam diameter to about 100 mm. As shown in FIG. 4, the half-wave plate 60, which is made of quartz, is so disposed that its optic axis 60a is inclined from the plane of incidence of the polarizing beam splitter 53 by 22.5°. The mirror 63 is formed of dielectric multilayer films and so disposed that its plane of incidence is parallel with that of the polarizing beam splitter 53, and that incident light strikes it at an incident angle of 45°. The mirror 63 is so formed as to cause an optical phase retardance of 90° between mutually orthogonal polarization components when linearly polarized incident light has an incident angle of 45° and a vibration direction that is inclined from the plane of incidence by 45°.

A quarter-wave plate 55 and a reference surface 56, which constitute a reference optical system, are arranged in this order in the travelling direction of reflected light from the polarizing beam splitter 53 after being emitted from the laser light source 50. A linear polarizer 65 and an imaging lens 66 are arranged in this order in the travelling direction of reflected light from the polarizing beam splitter 53 after returning from the subject surface 64. The quarter-wave plate 55 made of quartz is so disposed that its optic axis is inclined by 45° from the plane of incidence of the polarizing beam splitter 53. Similarly, the linear polarizer 65 is so disposed that its transmission axis is inclined by 45° from the plane of incidence of the polarizing beam splitter 53. The imaging lens 66 causes reflected light from the reference surface 56 and the subject surface 64 to form an interference fringe on an image plane 67. The interference fringe is observed by a detection optical system (not shown).

In this embodiment constituted as described above, linearly polarized light 70 generated by the laser light source 50 passes through the first beam expander 51 and 52 and reaches the polarizing beam splitter 53. Since the linearly polarized light 70 is so generated as to have a polarization angle that is inclined from the plane of incidence of the polarizing beam splitter 53 by 45°, S-polarized component 71 of the linearly polarized light 70 is reflected by the polarizing beam splitter 53, and reaches the quarter-wave plate 55, whereby it is converted to circularly polarized light 72. The circularly polarized light 72 is reflected by the reference surface 56 to become circularly polarized light 73 rotating reversely to that of the incident circularly polarized light 72. The circularly polarized light 73 retrogresses the incident optical path, and is converted to P-polarized light 74 by the quarter-wave plate 55. The P-polarized light 74 passes through the polarizing beam splitter 53, and a component 75 of the P-polarized light 74 that is parallel with the transmission axis of the linear polarizer 65 passes through the polarizer 65 to reach the imaging lens 66.

On the other hand, P-polarized component 80 of the linearly polarized light 70 generated by the laser light source 50 passes through the polarizing beam splitter 53 and reaches the half-wave plate 60. The half-wave plate 60 is so disposed that its optic axis 60a is inclined from the plane of incidence of the polarizing beam splitter 53 by 22.5°. Therefore, by passing through the half-wave plate 60, the P-polarized light 80 is converted to linearly polarized light 81 whose polarization angle is inclined from the plane of incidence of the polarizing beam splitter 53 by 45°. The linearly polarized light 81 having such a polarization angle passes through the second beam expander 61 and 62 to reach the mirror 63. The mirror 63 is so disposed that incident light strikes it at an incident angle of 45°. Further, the mirror 63 is so disposed that its plane of incidence is parallel with that of the polarizing beam splitter 53, i.e., inclined from the polarization angle of the linearly polarized light 81 by 45°. Since the mirror 63 is so formed as to cause, under the above conditions, a 90° retardance between mutually orthogonal polarization components, the linearly polarized light 81 whose polarization angle is inclined from the plane of incidence by 45° is reflected by the mirror 63 to the direction perpendicular to the incidence direction while being converted to circularly polarized light 82. The circularly polarized light 82 is then reflected by the subject surface 64 to become circularly polarized light 83 rotating reversely to that of the incident circularly polarized light 82. The circularly polarized light 83 reversely rotating retrogresses the incident optical path, and is converted by the mirror 63 to linearly polarized light 84 whose polarization angle is inclined from the plane of incidence of the polarizing beam splitter 53 by −45°. The linearly polarized light 84 having such a polarization angle passes through the second beam expander 62 and 61, and then its polarization angle is rotated by the half-wave plate 60 by −45° becominving S-polarized light 85. The S-polarized light 85 is reflected by the polarizing beam splitter 53, and only its component 86 whose polarization angle is parallel with the transmission axis of the linear polarizer 65 passes through the polarizer 65 to reach the imaging lens 66.

As described above, the imaging lens 66 causes the reflected lights from the reference surface 56 and the subject surface 64 to form an interference fringe. An undulation of the subject surface 64 can be measured by observing the interference fringe with the detection optical system. Within the linearly polarized light 81 traveling from the half-wave plate 60 to the second beam expander 61 and 62 and having a polarization angle inclined by 45°, a component reflected by the second beam expander 61 and 62 is subjected to rotate by −45° of the polarization angle by the half-wave plate 60, and thereby converted to P-polarized light. Therefore, the light reflected by the second beam expander 61 and 62 passes through the polarizing beam splitter 53, and does not reach the imaging lens 66. Thus, this embodiment can provide the interferometer in which noise that is introduced to the imaging optical system is extremely small. Although this embodiment employs the half-wave plate 60, it suffices that the aperture of the half-wave plate 60 is approximately the same as that of the polarizing beam splitter 53, i.e., smaller than the diameter of the light expanded by the second beam expander 61 and 62. On the other hand, the reflecting mirror 63 formed of dielectric multilayer films can be manufactured more easily than the half-wave plate 60 or any quarter-wave plate at a lower cost. And the mirror 63 having an aperture large enough to match the subject surface 64 can be prepared without causing any problem. Since the mirror 63 is disposed in the parallel-beam optical path between the second beam expander 61 and 62 and the subject surface 64, there occurs no aberration problem.

The mirror 63 is constituted such that dielectric thin films respectively having large and small refractive indices are alternately laid on each other. By properly designing the mirror 63, it can be constituted to cause an optical phase retardance of 90° between mutually orthogonal polarization components even where the incident angle of linearly polarized incident light is not 45° or the polarization plane of linearly polarized incident light is inclined from the plane of incidence at an angle other than 45°. However, because of the simplicity in design, it is preferred that, as in this embodiment, the mirror 63 be so formed as to cause a 90° retardance between mutually orthogonal polarization components when linearly polarized incident light strikes the mirror 63 at an incident angle of 45° and its polarization angle is inclined from the plane of incidence by 45°. While in the second embodiment the plane of incidence of the mirror 63 is made parallel with that of the polarizing beam splitter 53 and the mirror 63 reflects the incident light 81 vertically upward, it is possible to dispose the mirror 63 so that it reflects incident light 81 vertically downward. Further, since it is sufficient that the plane of incidence of the mirror 63 is inclined by 45° from the polarization plane of the linearly polarized incident light 81, the mirror 63 may be so disposed as to reflect the light 81 to the viewer's side or the side opposite to viewer's side in FIG. 3. In other words, the subject surface 64 can be disposed in any of vertically upward direction, the vertically downward direction, the horizontal direction toward the viewer's side, or the horizontal direction toward the side opposite to the viewer.

Figure 5:
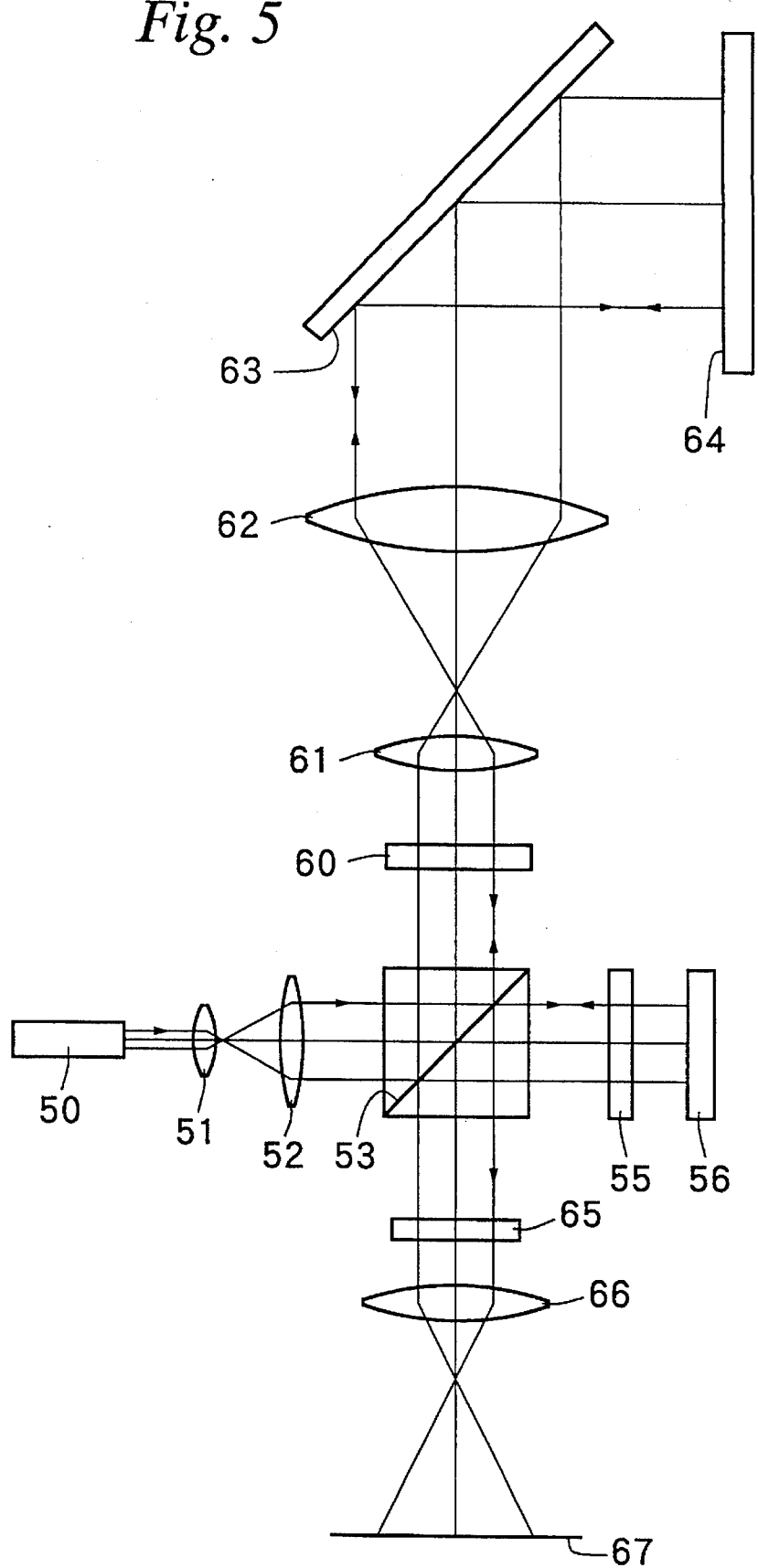
FIG. 5 shows a configuration of a Twyman-Green interferometer according to a third embodiment of the invention.

FIG. 5 shows a third embodiment. As is apparent from FIG. 5, this embodiment has a configuration obtained by replacing the measurement optical system and the reference optical system of the second embodiment with each other. This configuration allows the subject surface 64 and the reference surface 56 to be disposed in parallel with each other. Further, it is apparently possible to dispose the subject surface 64 so that it faces the right side, the viewer's side or the side opposite to the viewer in FIG. 5.

Figure 6:
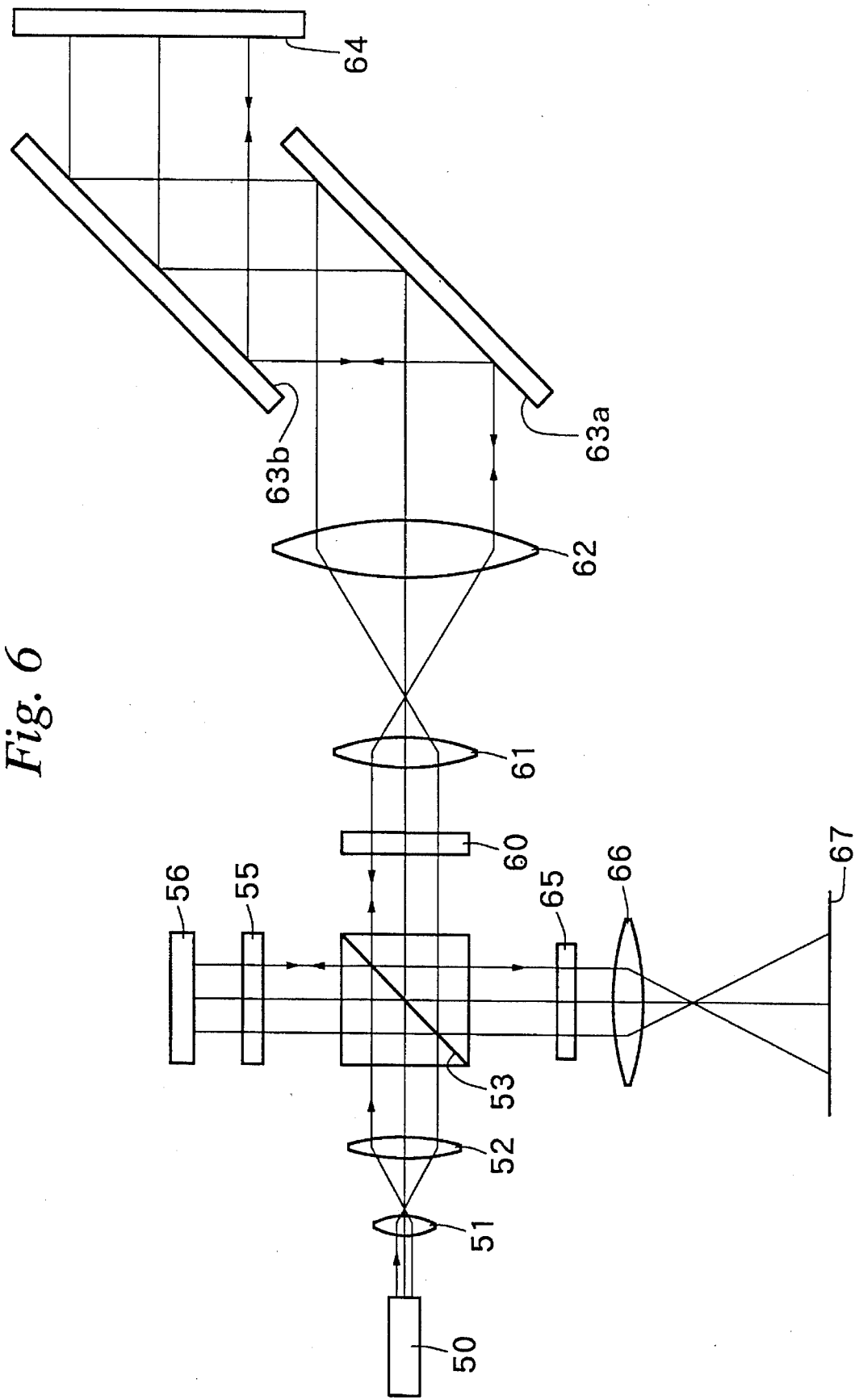
FIG. 6 shows a configuration of a Twyman-Green interferometer according to a fourth embodiment of the invention.
Figure 7:
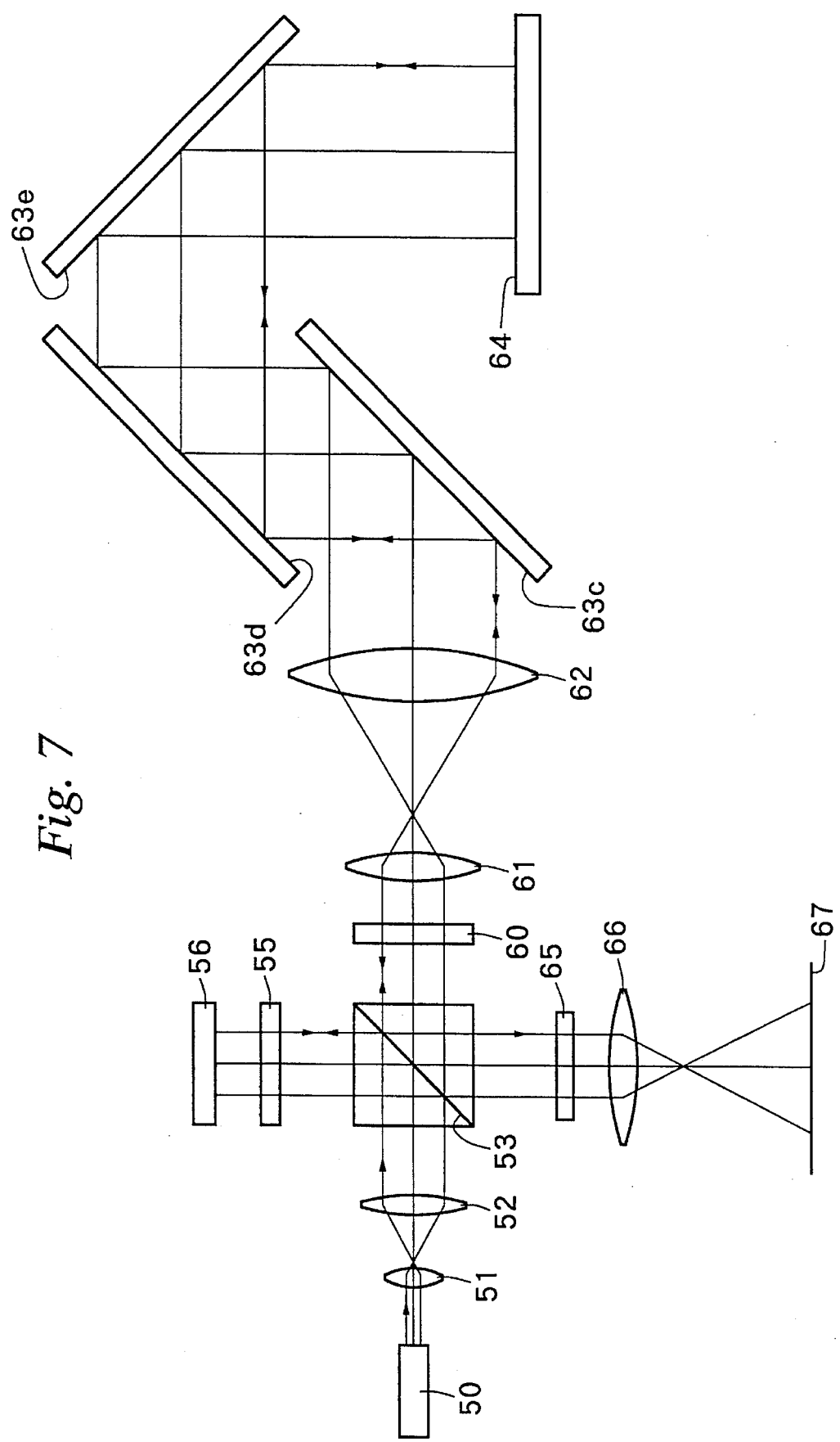
FIG. 7 shows a configuration of a Twyman-Green interferometer according to a fifth embodiment of the invention.

In the second and third embodiments, the single mirror 63 causes a 90° retardance between mutually orthogonal polarization components of the incident light. Where it is difficult to design the mirror 63 having such a feature, it may be constituted of a plurality of mirrors as in fourth or fifth embodiments described below. FIG. 6 shows the fourth embodiment. As is apparent from FIG. 6, the fourth embodiment is obtained by replacing the single mirror 63 of the second embodiment with first and second mirrors 63a and 63b. Similarly, as shown in FIG. 7, the fifth embodiment uses first, second and third mirrors 63c, 63d and 63e. Each of the mirrors 63a and 63b of the fourth embodiment is so formed as to substantially cause, through the reflection, an optical phase retardance of 45° between mutually orthogonal polarization components. Therefore, after being reflected by both of the mirrors 63a and 63b, the polarization components are given a 90° phase shift in total. Similarly, each of the mirrors 63c to 63e of the fifth embodiment is so formed as to substantially cause, through the reflection, an optical phase retardance of 30° between mutually orthogonal polarization components. Therefore, after being reflected by all of the mirrors 63c to 63e, the polarization components are given a 90° phase shift in total.

The mirrors 63a and 63b of the fourth embodiment are so disposed that their reflecting surfaces are parallel with each other. It is noted that the mirrors 63a and 63b can be so disposed that their planes of incidence are parallel with each other, and that their reflecting surfaces are perpendicular to each other. In the fifth embodiment, the first mirror 63c and the second mirror 63d are so disposed that their reflecting surfaces are parallel with each other, and the second mirror 63d and the third mirror 64e are so disposed that their planes of incidence are parallel with each other, and that their reflecting surfaces are perpendicular to each other. In the fourth embodiment, either incident light and reflected light existing between the mirrors 63a and 63b is elliptically polarized light whose P- and S-polarized components have a 45° phase shift with each other. In the fifth embodiment, either incident light and reflected light existing between the first mirror 3c and the second mirror 63d is elliptically polarized light whose P- and S-polarized components have a 30° phase shift with each other, and light existing between the second mirror 63b and the third mirror 63e is elliptically polarized light whose P- and S-polarized components have a 60° phase shift with each other.

Figure 8:
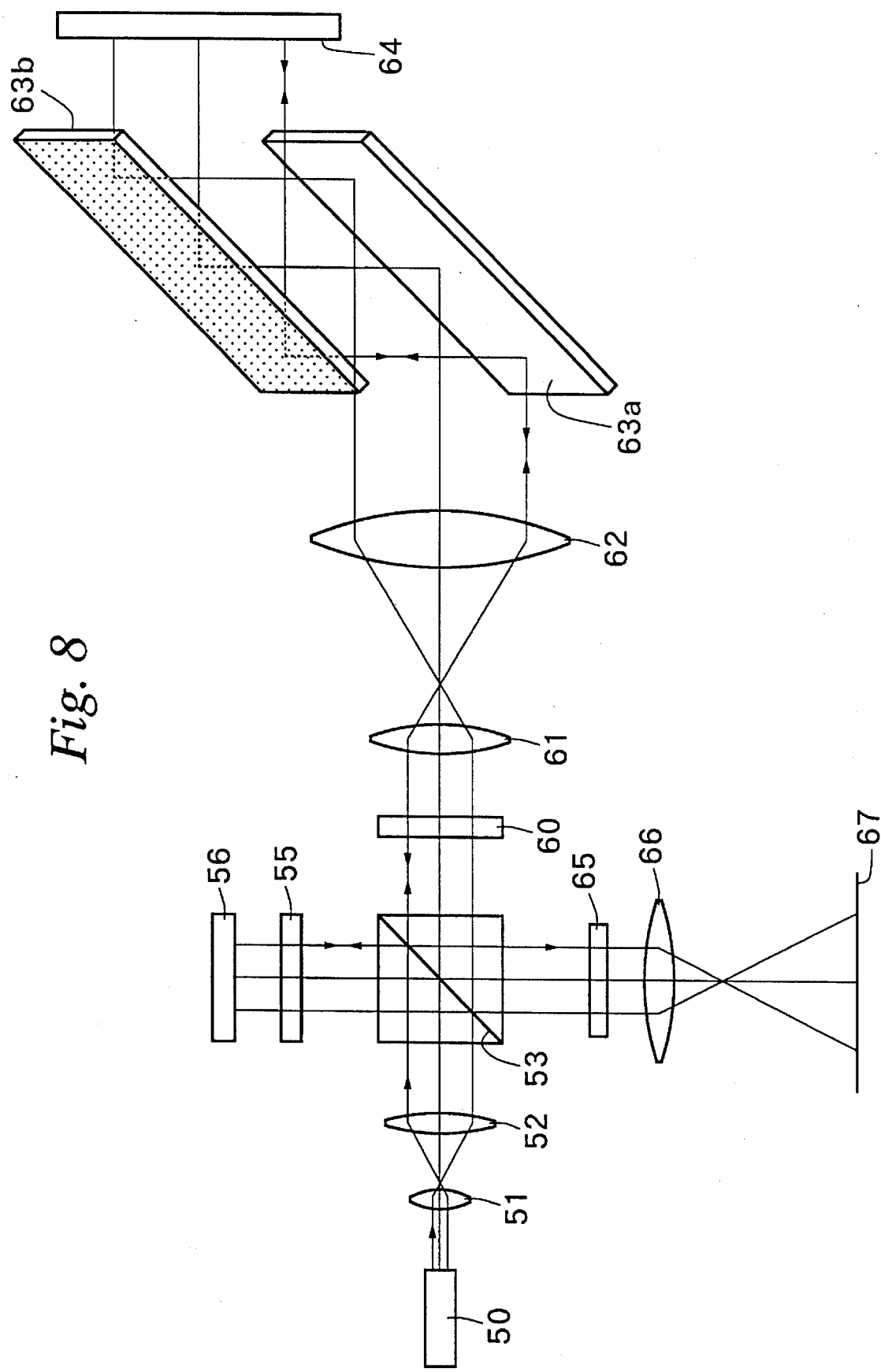
FIG. 8 shows a configuration of a Twyman-Green interferometer according to a sixth embodiment of the invention.

In the second to fifth embodiments described above, the half-wave plate 60 is used to incline the vibration direction of the light striking the mirror 63 of the second and third embodiment, the mirror 63a of the fourth embodiment, or the mirror 63c of the fifth embodiment, from plane of incidence of those mirrors by 45°. However, the same effect can be obtained by inclining by 45° the mirrors and the subject surface 64 in a unified manner, with eliminating the half-wave plate 60. FIG. 8 shows a sixth embodiment having such a configuration. The sixth embodiment is obtained by inclining, in a unified manner, the two mirrors 63a and 63b and the subject surface 64 by 45° from the plane of incidence of the polarizing beam splitter 53. This configuration provides an interferometer which uses no wavelength plates at all in the measurement optical system.

Figure 9:
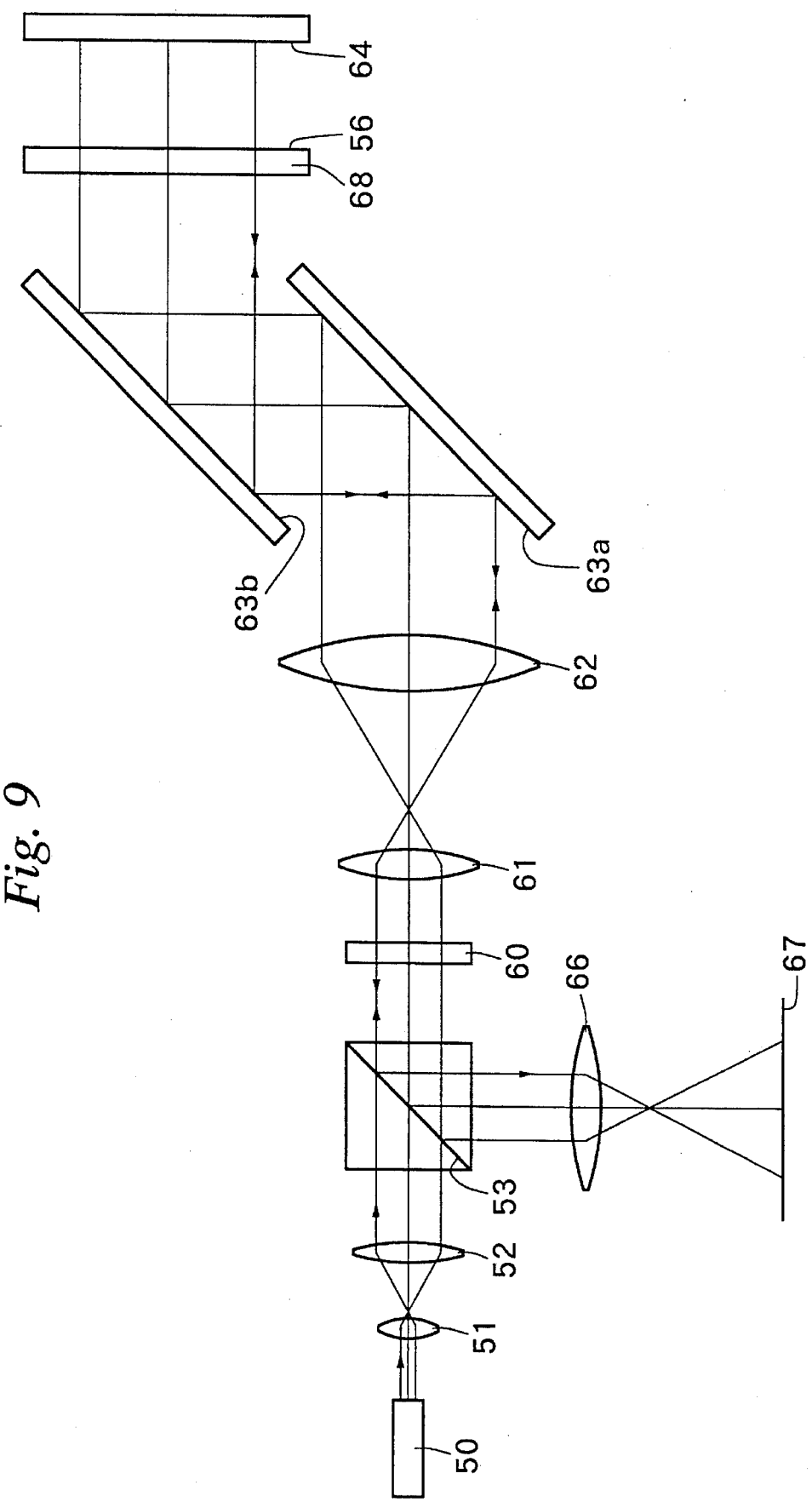
FIG. 9 shows a configuration of a Fizeau interferometer according to a seventh embodiment of the invention.

In a seventh embodiment shown in FIG. 9, the fourth embodiment is applied to a Fizeau interferometer. Therefore, a parallel plate 68 is disposed between the second mirror 63b and the subject surface 64, and the back face of the parallel plate 68 serves as the reference surface 56. Since reflected lights from the reference surface 56 and the subject surface 64 are in the same polarization state, the polarization plate 65 disposed between the polarizing beam splitter 53 and the imaging lens 66 in the fourth embodiment, is omitted in this seventh embodiment. With this configuration, as in the second to sixth embodiments, light reflected by the beam expander 61 and 62 does not reach the imaging optical system, so as to enable accurate measurement of the surface profile of the subject surface 64.

Although the embodiments of the present invention have been described above, various modifications are possible without departing from the spirit of the invention which is defined solely in the appended claims.

What is claimed is:

1. An interferometer comprising a light source emitting coherent light, a beam splitter introducing said coherent light to a reference surface and a subject surface to be measured, each surface reflecting incident light to said beam splitter, an imaging optical system outside of the light paths between the beam splitter and the reference surface and the subject surface the imaging optical system comprising front and rear lens members, said front lens member having a rear focal point between said front and rear lens members, said imaging optical system being movable as a single unit along its axis for focusing at an image plane an interference fringe of the reflected light from said reference and subject surfaces introduced through the beam splitter, and a detection optical system measuring said interference fringe, said interferometer further comprising:

an alignment optical member removably interposed in an optical path between said imaging optical system and said image plane so that a rear focal point of the alignment optical member is located at the image plane;

wherein said alignment optical member is inserted into the optical path in aligning the subject surface and is removed from the optical path in measuring the interference fringe; and aperture means disposed at the rear focal point of the front lens member of the imaging optical system and movable along with the imaging optical system, for decreasing an aperture opening during measurement and increasing the aperture opening during alignment.

2. The interferometer according to claim 1, wherein said imaging optical system is constituted as a double-sided telecentric optical system.

3. The interferometer according to claim 1, wherein said aperture means comprises a diaphragm which is removed in aligning the subject surface.

4. The interferometer according to claim 1, wherein said aperture means comprises a variable diaphragm which is kept open in aligning the subject surface.

5. The interferometer according to claim 1, further comprising attenuating means for attenuating light intensity on the image plane in aligning the subject surface.

6. The interferometer according to claim 5, wherein said attenuating means is a neutral density filter which is inserted into and removed from the optical path together with said alignment optical member.

7. The interferometer according to claim 1, wherein said beam splitter is a polarizing beam splitter, a lens system is interposed between said polarizing beam splitter and the subject surface, and a quarter-wave plate is disposed closer to the subject surface than a lens located right behind the polarizing beam splitter.

8. The interferometer according to claim 7, wherein said quarter-wave plate is disposed at a position downstream of a rear focal point of the lens directly behind the polarizing beam splitter where the incident light is diverging.

* * * * *